United States Patent
Fu et al.

(10) Patent No.: US 9,751,098 B2
(45) Date of Patent: Sep. 5, 2017

(54) GYRATING NOZZLE SPRAY GUN

(71) Applicant: Neutek International Inc., New Taipei (TW)

(72) Inventors: Den-Nan Fu, New Taipei (TW); Huang-Yuan Huang, New Taipei (TW)

(73) Assignee: NEUTEK INTERNATIONAL INC., New Taipei (TW)

( * ) Notice: Subject to any disclaimer, the term of this patent is extended or adjusted under 35 U.S.C. 154(b) by 198 days.

(21) Appl. No.: 14/709,146

(22) Filed: May 11, 2015

(65) Prior Publication Data
US 2016/0332175 A1 Nov. 17, 2016

(51) Int. Cl.
| | | |
|---|---|---|
| *B05B 3/06* | (2006.01) | |
| *B08B 3/02* | (2006.01) | |
| *B05B 7/06* | (2006.01) | |
| *B05B 7/24* | (2006.01) | |
| *B05B 1/00* | (2006.01) | |
| *B05B 3/04* | (2006.01) | |

(Continued)

(52) U.S. Cl.
CPC .............. *B05B 3/06* (2013.01); *B05B 1/005* (2013.01); *B05B 3/04* (2013.01); *B05B 7/064* (2013.01); *B05B 7/2435* (2013.01); *B05B 7/30* (2013.01); *B08B 3/028* (2013.01); *B08B 5/02* (2013.01); *B60S 3/044* (2013.01)

(58) Field of Classification Search
CPC .. B08B 3/02; B08B 3/028; B05B 3/06; B05B 1/005; B05B 7/30; B05B 7/064; B05B 7/2435; B05B 3/04; B05B 3/16; B05B 7/0416; B60S 3/044

See application file for complete search history.

(56) References Cited

U.S. PATENT DOCUMENTS

| | | | | |
|---|---|---|---|---|
| 2,983,452 A | * | 5/1961 | Lindbloom | A22B 5/08 |
| | | | | 239/210 |
| 3,868,949 A | * | 3/1975 | Arneson | A61H 33/6036 |
| | | | | 4/541.6 |

(Continued)

FOREIGN PATENT DOCUMENTS

| | | | | | |
|---|---|---|---|---|---|
| JP | 2014036948 A | * | 2/2014 | | B05B 3/06 |
| TW | DE 202015102785 U1 | * | 6/2015 | | B05B 3/06 |

*Primary Examiner* — Arthur O Hall
*Assistant Examiner* — Steven M Cernoch
(74) *Attorney, Agent, or Firm* — Muncy, Geissler, Olds & Lowe, P.C.

(57) ABSTRACT

A gyrating nozzle spray gun includes a grip including an air inlet, a valve seat, a gas-delivery tube connected to the valve seat and terminating in a mating connection portion and a trigger operable for letting external compressed air go into the air inlet and the gas-delivery tube, an attachment tube connected to the mating connection portion of the gas-delivery tube, and a gyrating pattern generator including a gas-supply tube connected to the mating connection portion and suspended in an accommodation chamber, a bearing mounted on a connecting portion, a coupling socket mounted on an outer race and a gyrating nozzle fastened to the coupling socket and rotatably disposed in an orifice and defining a gas accumulation chamber and an oblique jet hole for ejection of the intake flow of compressed air that goes through the air inlet, the gas-delivery tube and the gas-supply tube into the gas accumulation chamber.

10 Claims, 8 Drawing Sheets

(51) Int. Cl.
*B05B 7/30* (2006.01)
*B60S 3/04* (2006.01)
*B08B 5/02* (2006.01)

(56) References Cited

U.S. PATENT DOCUMENTS

| | | | | |
|---|---|---|---|---|
| 4,523,340 A * | 6/1985 | Watkins | ............. | A61H 33/6063 261/DIG. 75 |
| 4,689,839 A * | 9/1987 | Henkin | ................ | A61H 33/027 239/416.4 |
| 4,704,826 A * | 11/1987 | Kirkland | ................ | B24C 3/325 188/296 |
| 4,716,604 A * | 1/1988 | Watkins | ............. | A61H 33/6063 138/110 |
| 4,821,961 A * | 4/1989 | Shook | ....................... | B05B 3/06 239/253 |
| 5,060,862 A * | 10/1991 | Pacht | ....................... | B05B 3/06 239/252 |
| 5,104,043 A * | 4/1992 | Pacht | ....................... | B05B 3/006 239/128 |
| 5,232,161 A * | 8/1993 | Clemmons | ............ | B05B 1/1654 239/345 |
| 5,284,298 A * | 2/1994 | Haynes | ................... | B05B 3/001 239/254 |
| 5,909,848 A * | 6/1999 | Zink | ........................ | B05B 3/003 188/184 |
| 6,193,169 B1 * | 2/2001 | Steinhilber | ............. | B05B 3/003 239/240 |
| 7,546,959 B2 * | 6/2009 | Wagner | ................... | B05B 3/003 239/251 |
| 8,056,830 B1 * | 11/2011 | Pedersen | ................ | B05B 3/028 239/222.13 |
| 8,480,011 B2 * | 7/2013 | Endo | ....................... | B05B 3/022 239/226 |
| 8,690,077 B2 * | 4/2014 | Sendo | .................... | B05B 3/022 239/226 |
| 8,857,737 B2 * | 10/2014 | Chen | ........................ | B05B 3/06 239/302 |
| 9,144,810 B2 * | 9/2015 | Bosua | .................. | B05B 15/025 |
| 9,211,560 B1 * | 12/2015 | Chen | ...................... | B05B 3/06 |
| 9,321,067 B2 * | 4/2016 | Schaer, III | ............... | B05B 3/02 |
| 9,399,230 B2 * | 7/2016 | Wojciechowski, III | .. | B05B 3/06 |
| 9,475,071 B2 * | 10/2016 | Endo | ....................... | B05B 3/022 |
| 2010/0320289 A1 * | 12/2010 | Kuo | ........................ | B05B 3/022 239/290 |
| 2012/0286065 A1 * | 11/2012 | Lin | ........................ | B05B 3/0409 239/225.1 |
| 2014/0008457 A1 * | 1/2014 | Bosua | .................. | B05B 15/025 239/104 |
| 2014/0061334 A1 * | 3/2014 | Liao | ......................... | B05B 3/00 239/315 |
| 2015/0266041 A1 * | 9/2015 | Liao | ......................... | B05B 3/06 239/373 |
| 2016/0001313 A1 * | 1/2016 | Chen | ....................... | B05B 3/06 239/332 |
| 2016/0339458 A1 * | 11/2016 | Fu | .......................... | B60S 3/044 |
| 2017/0072414 A1 * | 3/2017 | Fu | .......................... | B60S 3/044 |

* cited by examiner

GYRATING NOZZLE SPRAY GUN

BACKGROUND OF THE INVENTION

1. Field of the Invention

The present invention relates to spray gun technology and more particularly, to a gyrating nozzle spray gun, which comprises a grip providing a gas-delivery tube, an attachment tube connected to the gas-delivery tube, a gyrating pattern generator connected to the gas-delivery tube and holding a gyrating nozzle in an orifice of the attachment tube in a rotatable manner for ejecting compressed air.

2. Description of the Related Art

With advances in technology, all aspects of the quality of our lives have been continuously improving. In transportation, cars and motorcycles are widely used by people as personal transportable vehicles. The number of cars and motorcycles keeps increasing. Many automatic washing machines are commercially available for washing cars and motorcycles. These automatic washing machines commonly use rotating brushes for cleaning cars. Cleaning a car with rotating brushes cannot effectively remove stains and dirt from the edges, or convex and concave portions of the body of the car. Some people would wash their car manually with clean water, and then wipe off residual water stains from the body of the car with a dry cloth. However, cleaning a car in this manner is labor intensive and time consuming.

In the implementation of a general cleaning work, people normally will apply a flow of water to the surface of the object to be cleaned and simultaneously wipe the surface of the object with a brush or cloth. When cleaning a car or a building, it is necessary to apply a strong jet of water to the surface to be cleaned and then to wipe the surface with a brush or cloth. For ejecting a strong jet of water onto the surface to be cleaned, people normally will attach a water hose to a water tap and squeeze the terminal end of the water hose with the fingers, causing water to be ejected out of the terminal end of the water hose onto the surface to be cleaned. After washing the surface with jets of water, a brush or cloth is then used to clean the washed surface. This cleaning method is time-consuming and wastes a large amount of water, and therefore, it does not meet the demands of energy and water saving. In order to improve the problem of waste of water resources, some designs are created to combine the use of high-pressure air with a water gun for strengthening the force of water scour and controlling the time of water consumption, avoiding causing a huge loss of water. As illustrated in FIG. 8, a conventional gyrating nozzle spray gun A is shown. The gyrating nozzle spray gun A generally comprises a handle A1, a T-bar A2, a liquid tank A3, and a spray nozzle assembly B. The spray nozzle assembly B comprises a horn-shaped barrel B1 having a screw connection B11 located at one end thereof and fastened to an air output end A4 of the T-bar A2, a gyrating tube C having connector C1 located at one end thereof and rotatably coupled to air output end A4 of the T-bar A2 inside the screw connection B11, a plurality of counterweights C2 mounted around the periphery of the gyrating tube C, a dip tube C3 inserted through the gyrating tube C and the T-bar A2 and dipped in the liquid tank A3, and a nozzle tip C31 located at one end of the dip tube C3. In application, a flow of compressed air from an external compressed air source is guided through an air passage in the handle A1 and the T-bar A2 into the gyrating tube C. When compressed air goes through the gyrating tube C and the nozzle tip C31 of the dip tube C3, a Venturi effect is created to suck the storage liquid out of the liquid tank A3 into the T-bar A2 for mixing with the compressed air around the nozzle tip C31 so that the air-liquid mixture can be forced out of horn-shaped barrel B1 in the form of a mist of fine droplets for application. However, in actual application, when the gyrating tube C of the gyrating nozzle spray gun A is forced by the flow of compressed air to rotate in the horn-shaped barrel B1 at a high speed, the gyrating tube C and the counterweights C2 will be forced to rub against the inside wall of the horn-shaped barrel B1, causing the horn-shaped barrel B1 to wear quickly with use. After a long use, the connection area between the connector C1 of the gyrating nozzle C and the output end A4 of the T-bar A2 can break easily, and the broken component part can be forced out of the horn-shaped barrel B1, leading to an accident.

Therefore, it is desirable to provide a gyrating nozzle spray gun that eliminates the problem of rubbing between the gyrating nozzle and the inside wall of the horn-shaped barrel and the problem of breaking possibility of the gyrating tube during operation.

SUMMARY OF THE INVENTION

The present invention has been accomplished under the circumstances in view. It is therefore the main object of the present invention to provide a gyrating nozzle spray gun, which comprises grip equipped with a gas-delivery tube and a trigger, an attachment tube connected to the gas-delivery tube, and a gyrating pattern generator connected to the gas-delivery tube and holding a gyrating nozzle in an orifice of the attachment tube in a rotatable manner. Thus, when operating the trigger of the grip for letting a flow of compressed air enter the gas-delivery tube toward the gyrating nozzle, the intake flow of compressed air forces the gyrating nozzle of the gyrating pattern generator to rotate in the orifice of the attachment tube.

Preferably, the gyrating nozzle spray gun comprises a grip that comprises a trigger-controlled valve seat and a gas-delivery tube extended from the valve seat and terminating in a mating connection portion, an attachment tube connected to the mating connection portion of the gas-delivery tube, and a gyrating pattern generator, which comprises a gas-supply tube connected to the mating connection portion of the gas-delivery tube and suspending in an accommodation chamber of the attachment tube, a bearing, a coupling socket and a gyrating nozzle mounted on a connecting portion of the gas-supply tube. When operating the trigger of the grip, compressed air is guided through an air inlet of the grip into the gas-supply tube of the gyrating pattern generator and then forced out of an oblique jet hole of the gyrating nozzle, and at the same time, a centrifugal force is created and force the gyrating nozzle to rotate in an orifice of the attachment tube, and thus, a swirling flow of compressed air is ejected out of the spray gun. Further, the gas-delivery tube can be configured to provide a bottom connection tube for the connection of a water tank, and a water-delivery tube is mounted in the gas-delivery hole of the gas-delivery tube and extended from the bottom connection tube through the gas-supply hole of the gas-supply tube of the gyrating pattern generator into the gas accumulation chamber of the gyrating nozzle and terminating in a water outlet tip that is inserted into a through hole in the gyrating nozzle. Thus, when a swirling flow of compressed air is ejected out of the annular gap in the through hole around the water outlet tip, a flow of fluid is sucked into the bottom connection tube of the gas-delivery tube and the water-delivery tube and ejected out of the water outlet tip of the water-delivery tube, and the fluid being ejected out of the water outlet tip is then turned into a mist, compressed air is simultaneously ejected out of the oblique jet hole, making the mist finer.

Preferably, the gyrating pattern generator comprises a gas-supply tube, a bearing, a coupling socket and a gyrating nozzle. The gas-supply tube comprises a gas-supply hole axially extending through opposing front and rear ends thereof, a connecting portion located at one end thereof for supporting the bearing, the coupling socket and the gyrating nozzle, and a joining end piece located at an opposite end thereof and terminating in a threaded neck and threaded into a screw hole in a mating connection portion of the gas-delivery tube of the grip. The connecting portion of the gas-supply tube comprises a coupling stub tube of a relatively smaller outer diameter axially forwardly extended from one end of the gas-supply tube remote from the gas-delivery tube, and a tubular screw rod of a relatively smaller outer diameter axially forwardly extended from the coupling stub tube. The bearing comprises an axle hole coupled to the coupling stub tube. The coupling socket comprises a retaining hole fastened to an outer race of the bearing for synchronous rotation with the outer race of the bearing, and an outer thread extending around the periphery thereof. The gyrating nozzle comprises an inner thread threaded onto the outer thread of the coupling socket. Further, the gas accumulation chamber of the gyrating nozzle is disposed in communication with the gas-supply hole of the gas-supply tube. The oblique jet hole of the gyrating nozzle obliquely extends from the gas accumulation chamber to the outside of the gyrating nozzle. Thus, when an intake flow of compressed air is guided through the gas-supply hole of the gas-supply tube into the gas accumulation chamber of the gyrating nozzle, the gyrating nozzle and the coupling socket are forced to rotate with the outer race of the bearing relative to the gas-supply tube, and at the same time, compressed air accumulated in the gas accumulation chamber is ejected out of the gyrating nozzle through the oblique jet hole.

Preferably, the gas-delivery tube is a T-shaped three-way tube, comprising a bottom connection tube located at a bottom side thereof. Further, a water tank is fastened to the bottom connection tube of the gas-delivery tube and holding therein a fluid (such as water, detergent, soap, water wax, etc). Further, a dip tube is connected to the bottom connection tube and inserted into the water tank for sucking the fluid into the bottom connection tube. Further, a water-delivery tube is connected to the bottom connection tube in communication with the dip tube and inserted into the gas-delivery hole of the gas-delivery tube and terminating in a water outlet tip. The water outlet tip of the water-delivery tube is inserted into a through hole in the gyrating nozzle at one lateral side relative to the oblique jet hole. Thus, when a swirling flow of compressed air is ejected out of the annular gap in the through hole around the water outlet tip, a flow of fluid is sucked into the bottom connection tube of the gas-delivery tube and the water-delivery tube and ejected out of the water outlet tip of the water-delivery tube, and the fluid being ejected out of the water outlet tip is then turned into a mist, compressed air is simultaneously ejected out of the oblique jet hole, making the mist finer.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
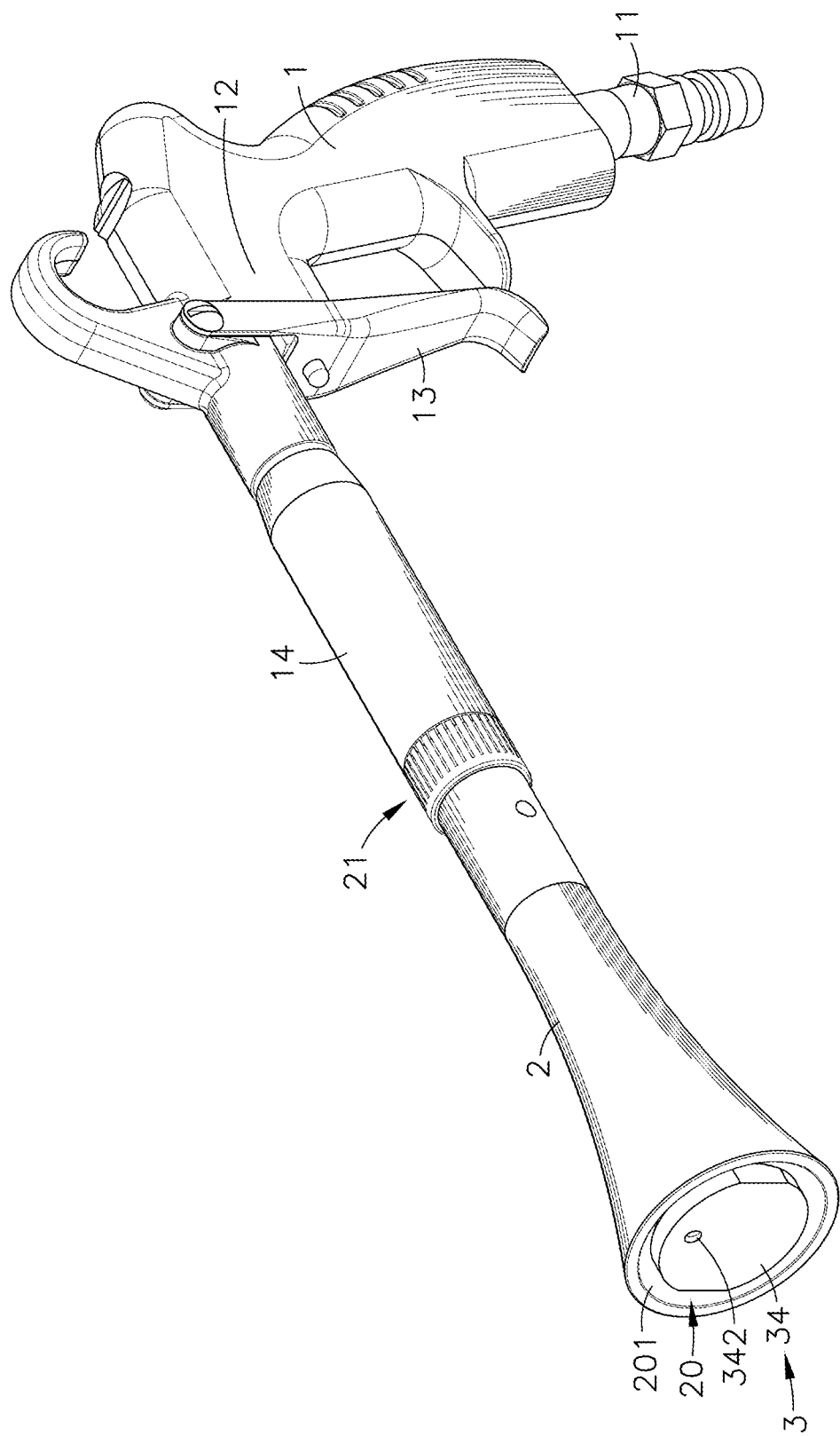
FIG. 1 is an oblique top elevational view of a gyrating nozzle spray gun in accordance with the present invention.
Figure 2:
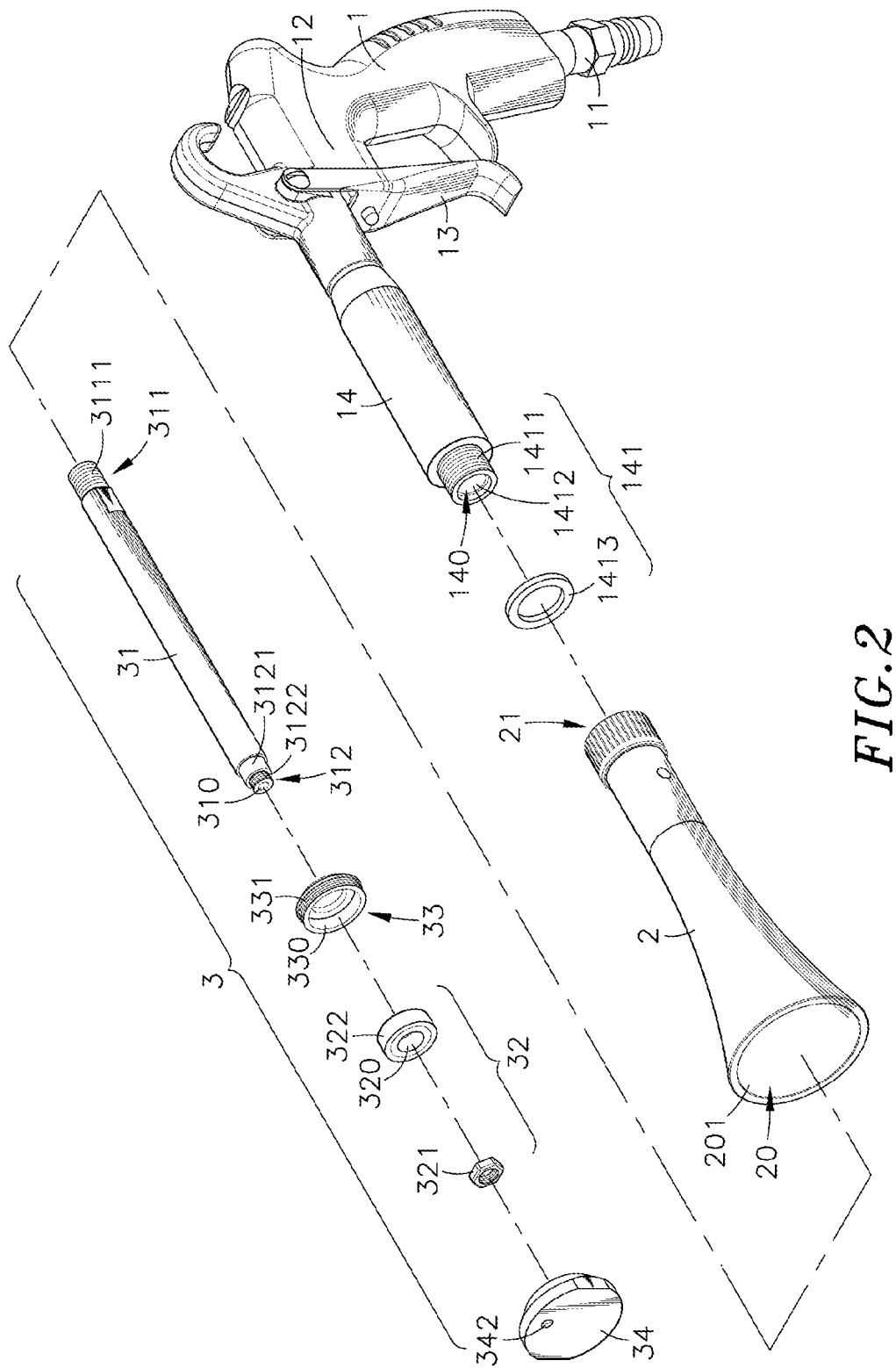
FIG. 2 is an exploded view of the gyrating nozzle spray gun in accordance with the present invention.
Figure 3:
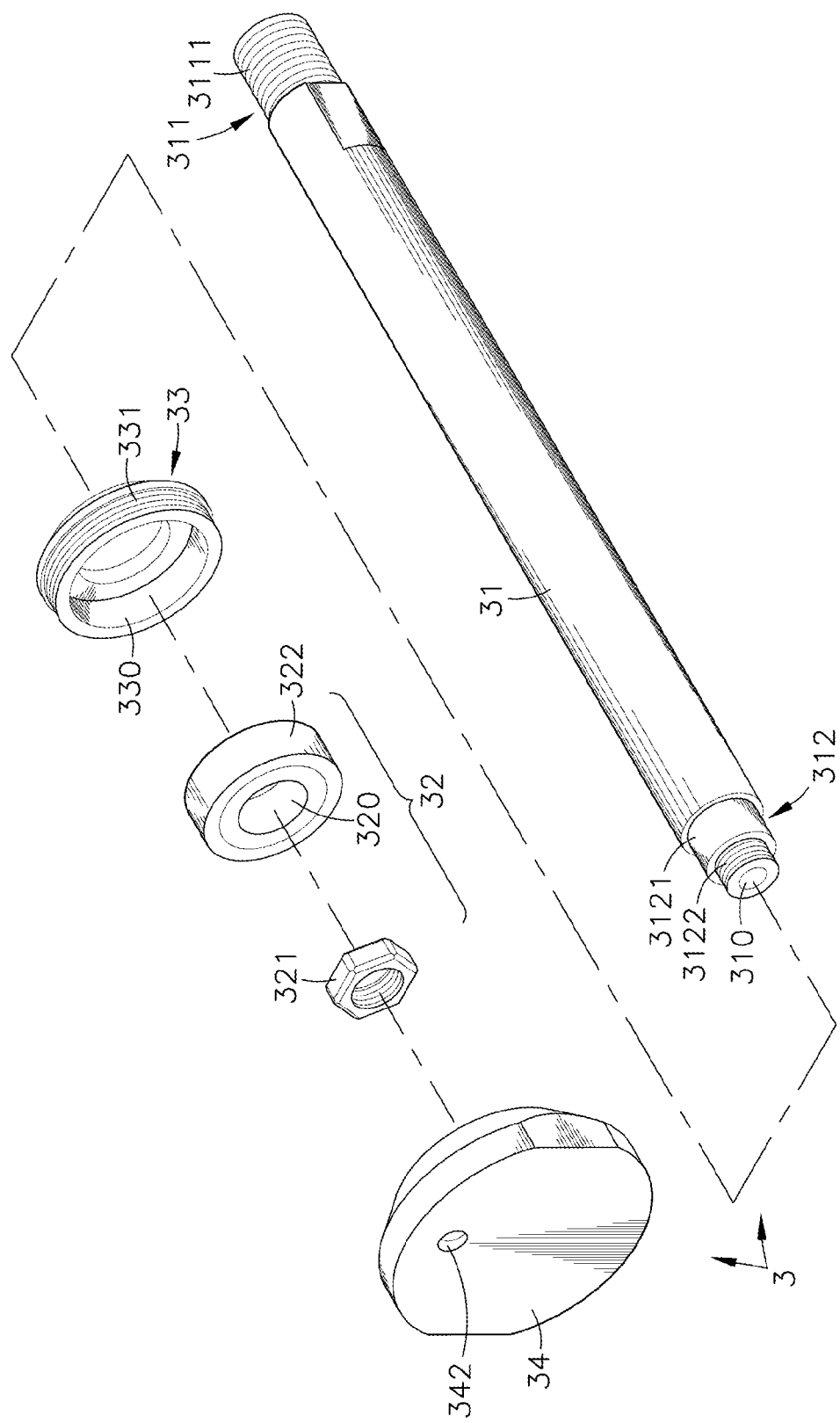
FIG. 3 exploded view of the gyrating pattern generator of the gyrating nozzle spray gun in accordance with the present invention.
Figure 4:
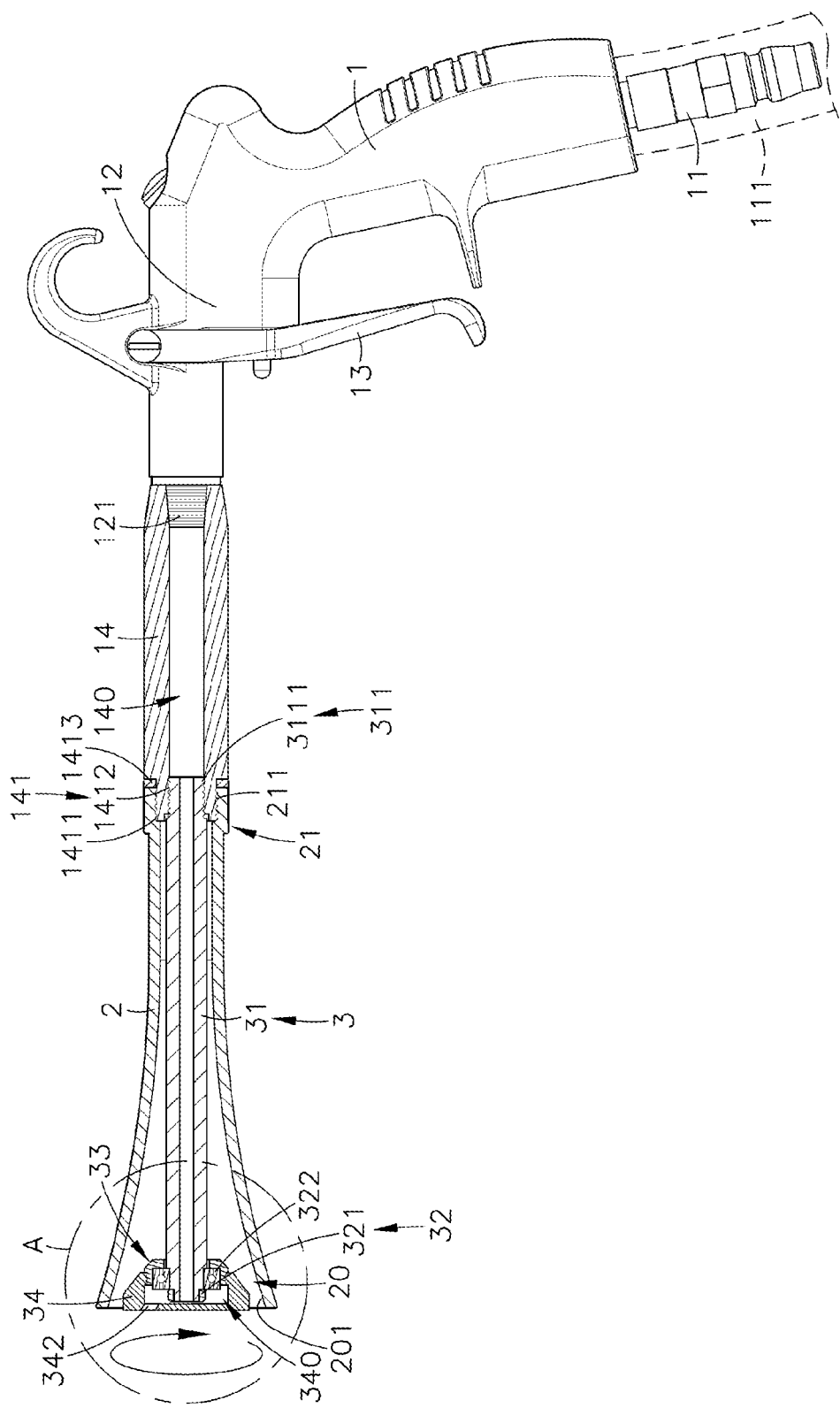
FIG. 4 is a sectional side view of the gyrating nozzle spray gun in accordance with the present invention.
Figure 5:
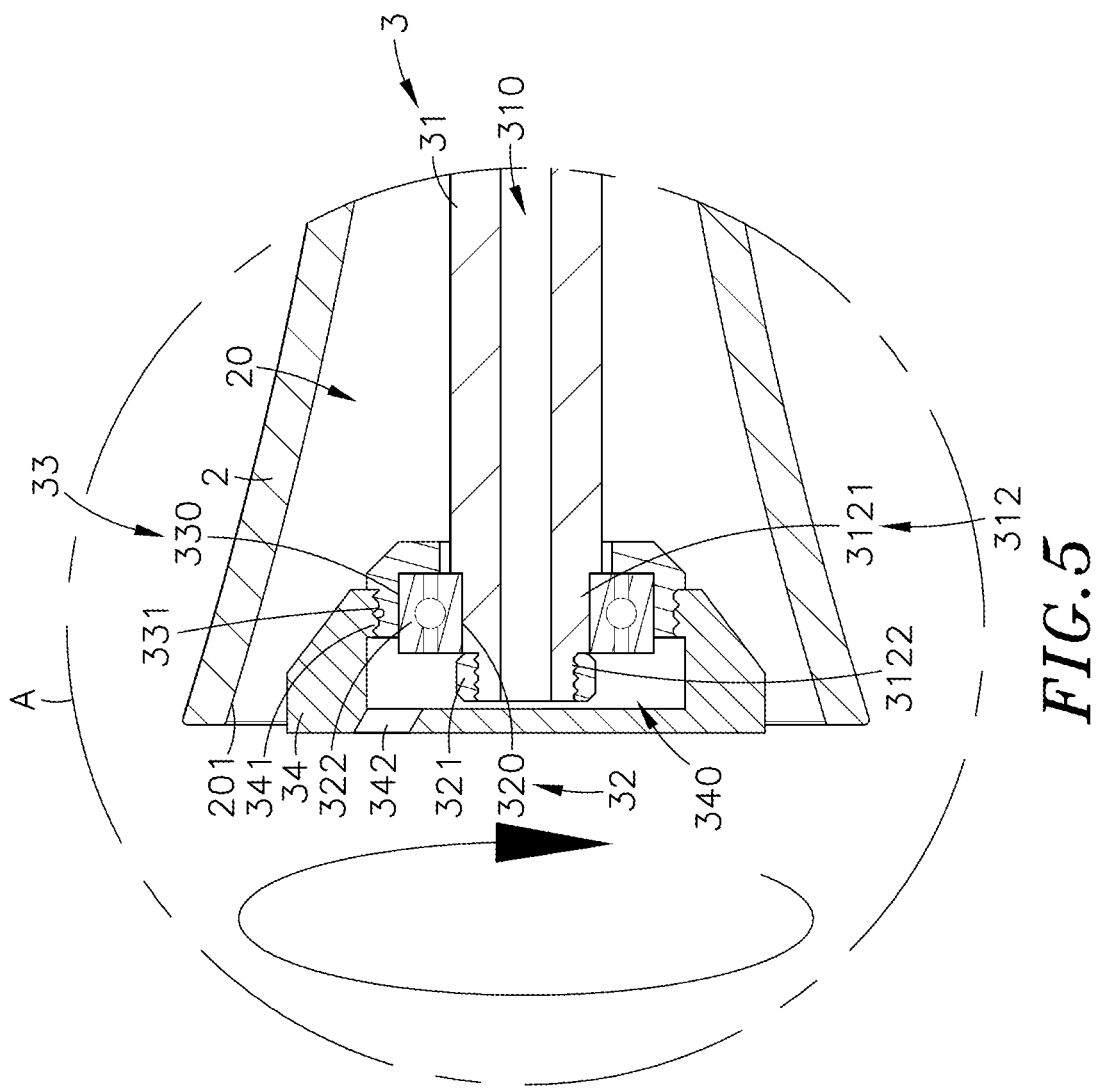
FIG. 5 is an enlarged view of Part A of FIG. 4.

Referring to FIGS. 1-5, an elevational view of a gyrating nozzle spray gun, an exploded view of the gyrating nozzle spray gun, an exploded view of the gyrating pattern generator of the gyrating nozzle spray gun and a sectional side view of the gyrating nozzle spray gun are shown. As illustrated, the gyrating nozzle spray gun comprises a grip 1, an attachment tube 2 and a gyrating pattern generator 3.

The grip 1 comprises an air inlet 11 located at a bottom side thereof, a valve seat 12 located at a top side thereof, a trigger 13 operable to control the valve seat 12 for letting in an outer compressed flow of air through the air inlet 11, and a gas-delivery tube 14 connected with an inner end thereof to an outer end of the valve seat 12 opposite to the air inlet 11 and defining therein an axially extending gas-delivery hole 140 in communication with the valve seat 12 and the air inlet 11. Further, the gas-delivery tube 14 comprises a mating connection portion 141 located at an opposite outer end thereof remote from the valve seat 12. The mating connection portion 141 is a mating connection screw rod 1411 extended from the outer end of the gas-delivery tube 14, defining therein a screw hole 1412 in communication with the gas-delivery hole 140.

The attachment tube 2 comprises a mating connection end piece 21 located at one end thereof, a mating connection screw hole 211 defined in the mating connection end piece 21, an expanded orifice 201 located in an opposite end thereof, and an accommodation chamber 20 defined therein and axially disposed in communication between the mating connection screw hole 211 and the orifice 201.

The gyrating pattern generator 3 comprises a gas-supply tube 31, a bearing 32, a coupling socket 33 and a gyrating nozzle 34. The gas-supply tube 31 comprises a gas-supply hole 310 axially extending through opposing front and rear ends thereof, a joining end piece 311 located at the rear end that is a threaded neck 3111 axially backwardly extended from the rear end of the gas-supply tube 31, and a connecting portion 312 located at the front end. The connecting portion 312 comprises a coupling stub tube 3121 axially forwardly extended from the front end of the gas-supply tube 31 and a tubular screw rod 3122 axially forwardly extended from the coupling stub tube 3121. The bearing 32 defines therein an axle hole 320 that is coupled to the coupling stub tube 3121 of the connecting portion 312 of the gas-supply tube 31. Further, a locknut 321 is threaded onto the tubular screw rod 3122 to stop the bearing 32 from falling out of the coupling stub tube 3121. The coupling socket 33 is mounted around the gas-supply tube 31, comprising a retaining hole 330 fastened to an outer race 322 of the bearing 32, and an outer thread 331 extended around the periphery thereof. The gyrating nozzle 34 comprises an inner thread 341 located in one side thereof and threaded onto the outer thread 331 of the coupling socket 33, a gas accumulation chamber 340 defined therein and inwardly extended from the outer thread 331, and an oblique jet hole 342 obliquely forwardly extended from the accumulation chamber 340 to the outside of the gyrating nozzle 34 at an eccentric location.

In installation, connect the air inlet 11 of the grip 1 to an external high-pressure air source. At this time, the user can operate the trigger 13 of the grip 1 to control the intake of compressed air from the external high-pressure air source through the air inlet 11. Further, a gasket ring 1413 is mounted around the mating connection screw rod 1411 of the mating connection portion 141 of the gas-delivery tube 14 of the grip 1, and then the mating connection screw hole 211 of the mating connection end piece 21 of the attachment tube 2 is threaded onto the mating connection screw rod 1411 of the mating connection portion 141 of the gas-delivery tube 14 and stopped at the gasket ring 1413 against the mating connection end piece 21 of the attachment tube 2. Further prior to fastening the mating connection screw hole 211 of the attachment tube 2 to the mating connection screw rod 1411 of the gas-delivery tube 14, the threaded neck 3111 of the joining end piece 311 of the gas-supply tube 31 of the gyrating pattern generator 3 is threaded into the screw hole 1412 of the mating connection portion 141 of the gas-delivery tube 14. After fastening the mating connection screw hole 211 of the mating connection end piece 21 of the attachment tube 2 to the mating connection screw rod 1411 of the mating connection portion 141 of the gas-delivery tube 14, the attachment tube 2 is disposed at the front side of the mating connection portion 141 of the gas-delivery tube 14 around the gas-supply tube 31, and the connecting portion 312 of the gas-supply tube 31 is suspended in the orifice 201 of the attachment tube 2, and the bearing 32, the coupling socket 33 and the gyrating nozzle 34 can then be coupled to the connecting portion 312 of the gas-supply tube 31 and rotatably suspended in the orifice 201 at an outer side of the accommodation chamber 20 of the attachment tube 2. Thus, the grip 1, the attachment tube 2 and the gyrating pattern generator 3 are assembled to constitute the gyrating nozzle spray gun of the present invention.

In application, connect the air inlet 11 of the grip 1 to the external high-pressure air source (for example, air compressor), and then operate the trigger 13 of the grip 1 to control the intake of compressed air from the external high-pressure air source through the air inlet 11 and an air-delivery hole 121 of the valve seat 12 into the gas-delivery hole 140 of the gas-delivery tube 14, enabling the intake flow of compressed air to go through the mating connection portion 141 of the gas-delivery tube 14 and the gas-supply hole 310 of the gas-supply tube 31 of the gyrating pattern generator 3 into the gas accumulation chamber 340 of the gyrating nozzle 34 and then to go from the gas accumulation chamber 340 through the oblique jet hole 342 toward the outside of the spray gun. At the same time, the gyrating nozzle 34 and the coupling socket 33 are forced to rotate on the outer race 322 of the bearing 32 by the pressure of the flow of compressed gas passing therethrough, and thus, a strong jet of air is continuously rotated and ejected onto the surface of the target (the body of a car or a building exterior glass) to remove water stains or dust from the surface of the target without causing damage.

Further, the attachment tube 2 that is connected to the gas-delivery tube 14 of the grip 1 can be a horn tube, straight tube or polygonal tube.

Figure 6:
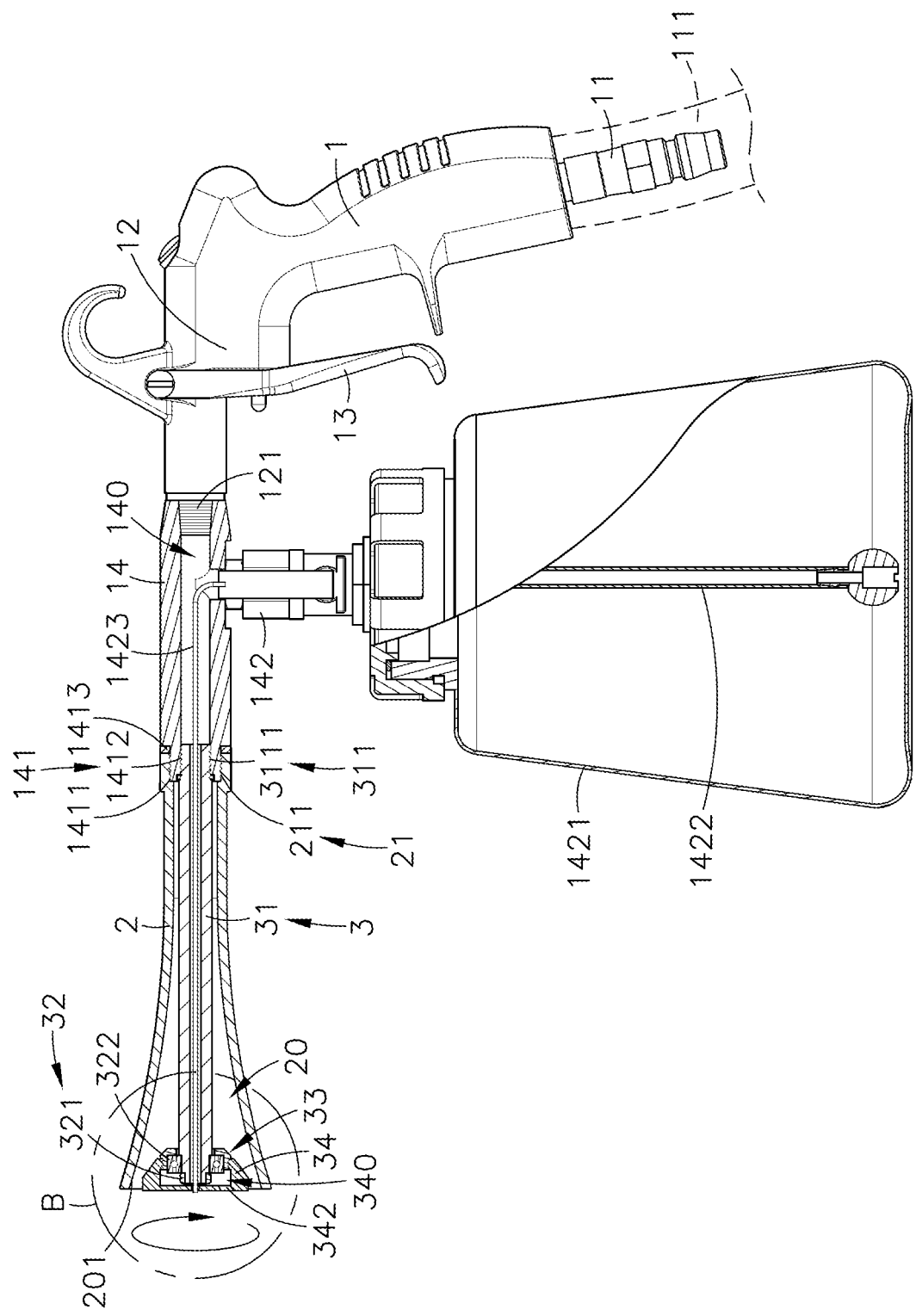
FIG. 6 is a sectional side view of an alternate form of the gyrating nozzle spray gun in accordance with the present invention.
Figure 7:
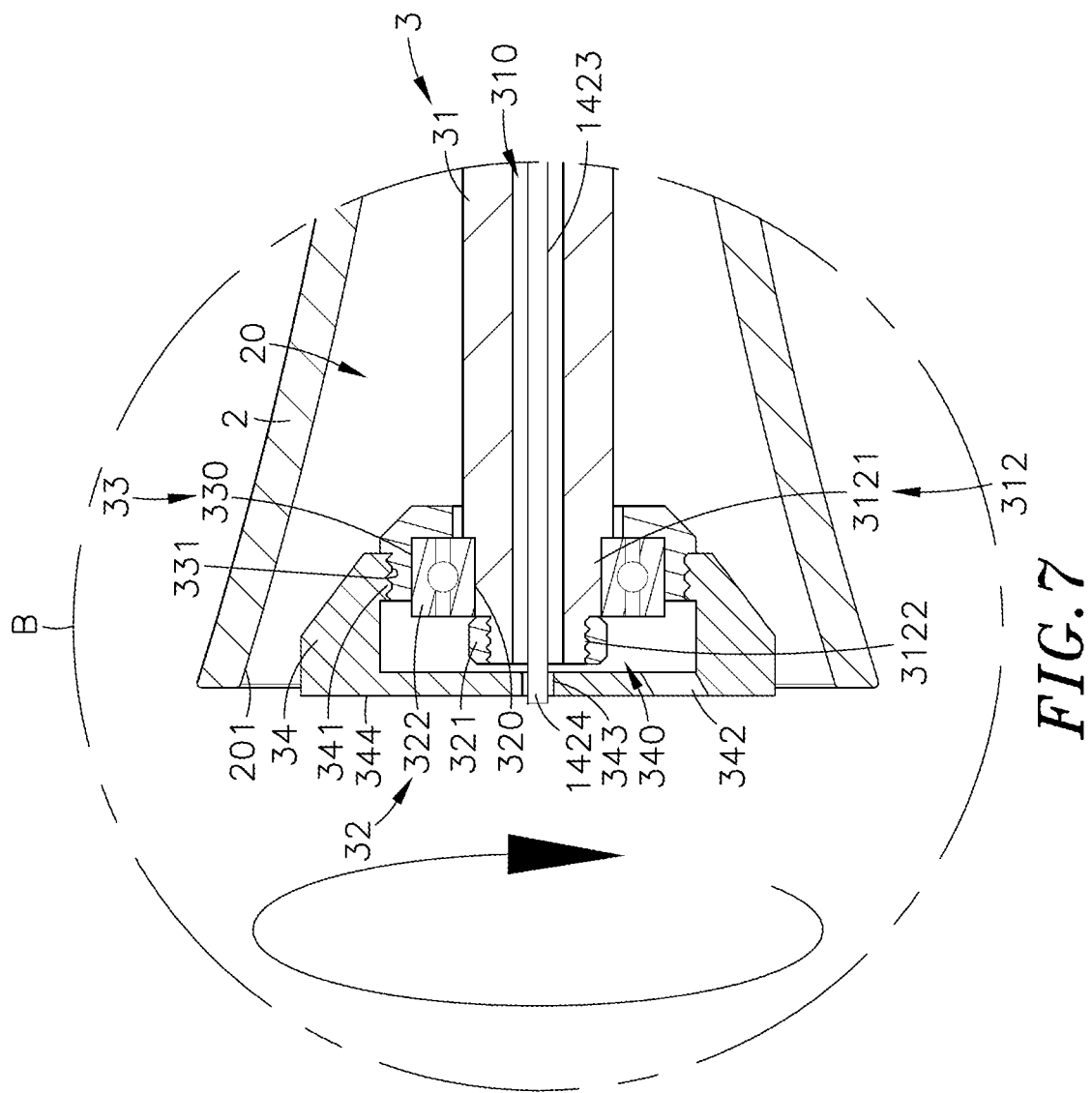
FIG. 7 is an enlarged view of Part B of FIG. 6.
Figure 8:
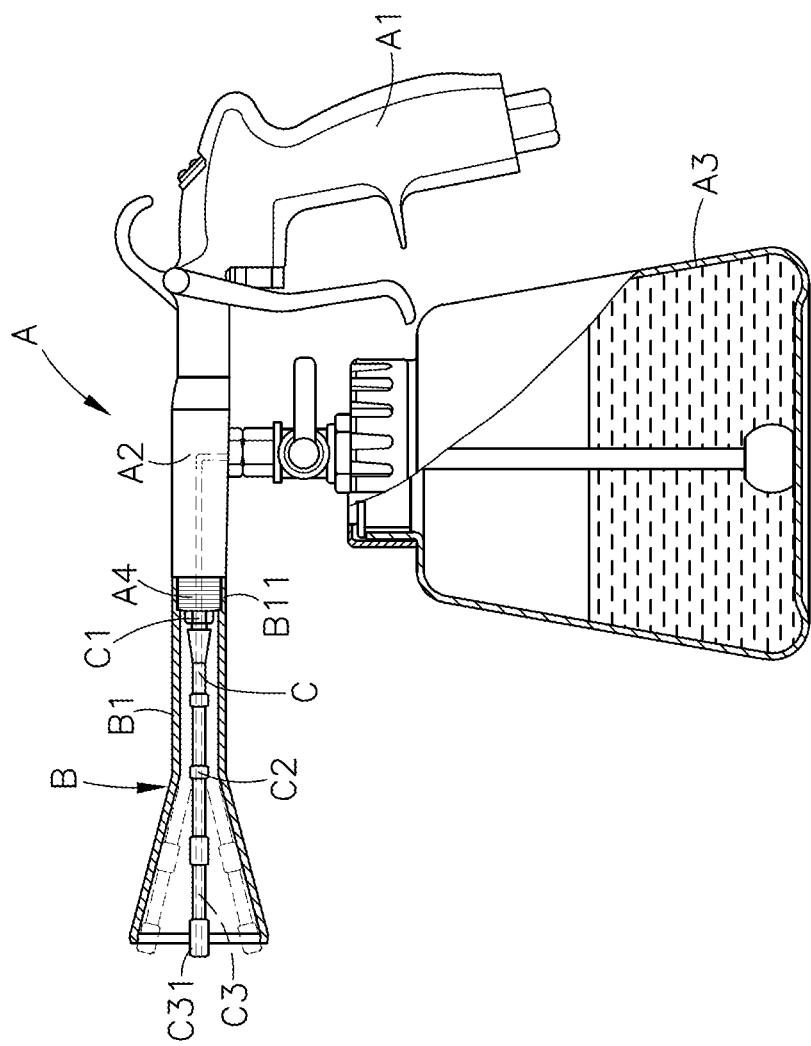
FIG. 8 is a sectional side view of a gyrating nozzle spray gun according to the prior art.

Referring to FIGS. 6 and 7, a sectional side view of an alternate form of the gyrating nozzle spray gun in accordance with the present invention and an enlarged view of Part B of FIG. 6 are shown. This alternate form is practical for ejecting a swirling flow of water mist. According to this alternate form, the gas-delivery tube 14 of the grip 1 is a T-shaped three-way tube comprising a bottom connection tube 142 vertically disposed at a bottom side thereof in communication with the gas-delivery hole 140 for the connection of a water tank 1421. Further, a dip tube 1422 is connected to the bottom connection tube 142 and suspending in the water tank 1421 near the bottom wall of the water tank 1421. Further, a water-delivery tube 1423 is mounted in the gas-delivery hole 140 of the gas-delivery tube 14 and extended from the bottom connection tube 142 through the gas-supply hole 310 of the gas-supply tube 31 of the gyrating pattern generator 3 into the gas accumulation chamber 340 of the gyrating nozzle 34 and terminating in a water outlet tip 1424 that is inserted into a through hole 343 that is located in the gyrating nozzle 34 and cut through a front surface 344 of the gyrating nozzle 34. The through hole 343 has a diameter larger than the outer diameter of the water outlet tip 1424 so that an annular gap is left in the through hole 343 around the water outlet tip 1424 of the water-delivery tube 1423. In application, connect the air inlet 11 of the grip 1 to an external high-pressure air source (air compressor) with an high pressure hose 111, and then operate the trigger 13 of the grip 1 to control the intake of compressed air from the external high-pressure air source through the air inlet 11 and an air-delivery hole 121 of the valve seat 12 into the gas-delivery hole 140 of the gas-delivery tube 14, enabling the intake flow of compressed air to go through the mating connection portion 141 of the gas-delivery tube 14 and the gas-supply hole 310 of the gas-supply tube 31 of the gyrating pattern generator 3 into the gas accumulation chamber 340 of the gyrating nozzle 34 and then to go from the gas accumulation chamber 340 through the oblique jet hole 342 toward the outside of the spray gun. At the same time, the gyrating nozzle 34 and the coupling socket 33 are forced to rotate on the outer race 322 of the bearing 32 by the pressure of the flow of compressed gas passing therethrough, and thus, a strong jet of air is continuously rotated and ejected out of the spray gun. When the intake flow of compressed air goes through the connecting portion 312 of the gas-supply tube 31 and the through hole 343 of the gyrating nozzle 34, a Venturi effect is created in the through hole 343, causing the contained fluid to be sucked from the water tank 1421 through the dip tube 1422 and the bottom connection tube 142 into the water-delivery tube 1423 and then guided out of the water-delivery tube 1423 through the water outlet tip 1424. When a flow of fluid is being ejected out of the water outlet tip 1424, compressed air is continuously guided into the gas accumulation chamber 340 of the gyrating nozzle 34 and ejected out of the oblique jet hole 342 and the annular gap in the through hole 343 around the water outlet tip 1424, causing the flow of fluid being ejected out of the water outlet tip 1424 to be turned into a mist. Thus, when the user operates the trigger 13 of the grip 1 to let a flow of compressed air go from the external high-pressure air source through the air inlet 11 into the gas-delivery tube 14 and the gas-supply tube 31 of the gyrating pattern generator 3 and the gas accumulation chamber 340 of the gyrating nozzle 34 and then go from the gas accumulation chamber 340 through the oblique jet hole 342 and the annular gap in the through hole 343 around the water outlet tip 1424 toward the outside of the spray gun, and at the same time, a flow of fluid is ejected out of the water outlet tip 1424 and turned into a mist. When a strong jet of compressed air is ejected out of the annular gap in the through hole 343 around the water outlet tip 1424 to turn the ejected flow of fluid into a mist, compressed air is simultaneously ejected out of the oblique jet hole 342, making the mist finer.

As stated above, the screw rod 3111 of the gas-supply tube 31 of the gyrating pattern generator 3 is threaded into the screw hole 1412 of the mating connection portion 141; the bearing 32 is mounted on the coupling stub tube 3121 of the connecting portion 312 of the gas-supply tube 31; the locknut 321 is threaded onto the tubular screw rod 3122 of the connecting portion 312 of the gas-supply tube 31. Further, the outer diameter of the locknut 321 is larger than the inner diameter of the axle hole 320 of the bearing 32. Thus, the bearing 32 is stopped in place by the locknut 321, and prohibited from falling out of the coupling stub tube 3121. Further, the retaining hole 330 of the coupling socket 33 is fastened to the outer race 322 of the bearing 32; the inner thread 341 of the gyrating nozzle 34 is threaded onto the outer thread 331 of the coupling socket 33; the gas-supply tube 31 of the gyrating pattern generator 3 is suspended in the accommodation chamber 20 of the attachment tube 2; the gyrating nozzle 34 is rotatably supported on one end of the gas-supply tube 31 within the orifice 201 of the attachment tube 2. When compressed air is guided into the gas-supply hole 310 of the gas-supply tube 31, it is accumulated in the gas accumulation chamber 340 of the gyrating nozzle 34 and then forced out of the oblique jet hole 342 of the gyrating nozzle 34, causing rotation of the gyrating nozzle 34 with the coupling socket 33 and the outer race 322 of the bearing 32. Thus, when a jet of compressed air is delivered through the gas-supply hole 310 and ejected out of the oblique jet hole 342, the gyrating nozzle 34 is rotated in the orifice 201 of the attachment tube 2 while the gas-supply tube 31 is maintained immovable in the accommodation chamber 20 of the attachment tube 2 without causing generation of an centrifugal force to force the gas-supply tube 31 away from the attachment tube 2, and thus, the structural strength of the attachment tube 2 and the gyrating pattern generator 3 is enhanced. Further, the water outlet tip 1424 of the water-delivery tube 1423 is inserted into the through hole 343 of the gyrating nozzle 34 of the gyrating pattern generator 3, and the dip tube 1422 is connected to the bottom connection tube 142 and dipped in the water tank 1421 for sucking in the contained fluid. Thus, when a flow of fluid is sucked into the dip tube 142 and guided through the water-delivery tube 1423 and the water outlet tip 1424 toward the outside of the through hole 343 of the gyrating nozzle 34, the ejected compressed air that goes out of the oblique jet hole 342 and the annular gap in the through hole 343 around the water outlet tip 1424 causes the fluid being ejected out of the water outlet tip 1424 to be turned into a mist. Further, the locknut 321 is threaded onto the tubular screw rod 3122 of the connecting portion 312 of the gas-supply tube 31 of the gyrating pattern generator 3 to stop the bearing 32 and the coupling socket 33 in place, avoiding falling of the bearing 32 and the coupling socket 33 out of the connecting portion 312. Further, the inner thread 341 of the gyrating nozzle 34 is threaded onto the outer thread 331 of the coupling socket 33. When the gyrating nozzle 34 and the coupling socket 33 are rotated relative to the bearing 32, the rotating direction the gyrating nozzle 34 and the coupling socket 33 is reverse to the threading direction between the gyrating nozzle 34 and the coupling socket 33, and thus, the centrifugal force produced during rotation of the gyrating nozzle 34 and the coupling socket 33 does not cause separation between the gyrating nozzle 34 and the coupling socket 33. Thus, in application, the assembly of the gyrating nozzle 34, bearing 32 and coupling socket 33 will not be forced to move away from the accommodation chamber 20 of the attachment tube 2, assuring a high level of spray gun operating safety and reducing the degree of danger in application.

As described above, the attachment tube 2 and the gyrating pattern generator 3 are connected to the gas-delivery tube 14 of the grip 1 by threading threaded neck 3111 of the joining end piece 311 of the gas-supply tube 31 of the gyrating pattern generator 3 into the screw hole 1412 of the mating connection screw rod 1411 of the mating connection portion 141 of the gas-delivery tube 14 and then threading the mating connection screw hole 211 of the mating connection end piece 21 of the attachment tube 2 onto the mating connection screw rod 1411 of the mating connection portion 141 of the gas-delivery tube 14, and then the bearing 32, the coupling socket 33 and the gyrating nozzle 34 are mounted at the connecting portion 312 of the gas-supply tube 31 of the gyrating pattern generator 3. In application, the air inlet 11 of the grip 1 is connected to an external high-pressure air source. By means of operating the trigger 13 to open the valve seat 12, compressed air is guided through the air inlet 11 of the grip 1 and the gas-delivery hole 140 of the gas-delivery tube 14 into the gas-supply tube 31 of the gyrating pattern generator 3 and the gas accumulation chamber 340 of the gyrating nozzle 34 and then forced out of the oblique jet hole 342 of the gyrating nozzle 34. When a jet of compressed air is forced out of the oblique jet hole 342 of the gyrating nozzle 34, the centrifugal force thus produced causes the gyrating nozzle 34 to rotate in the orifice 201 of the attachment tube 2. Further, the water tank 1421 is connected to the bottom connection tube 142 of the gas-delivery tube 14, and the dip tube 1422 is connected to the bottom connection tube 142 and dipped in the water tank 1421. Thus, when a swirling flow of compressed air is ejected out of the annular gap in the through hole 343 around the water outlet tip 1424, a flow of fluid is sucked into the dip tube 1422 and guided through the water-delivery tube 1423 and the water outlet tip 1424 toward the outside of the through hole 343 of the gyrating nozzle 34, and the fluid being ejected out of the water outlet tip 1424 is then turned into a mist, compressed air is simultaneously ejected out of the oblique jet hole 342, making the mist finer.

In conclusion, the invention provides gyrating nozzle spray gun, which comprises a grip that comprises a trigger-controlled valve seat and a gas-delivery tube extended from the valve seat and terminating in a mating connection portion, an attachment tube connected to the mating connection portion of the gas-delivery tube, and a gyrating pattern generator, which comprises a gas-supply tube connected to the mating connection portion of the gas-delivery tube and suspending in an accommodation chamber of the attachment tube, a bearing, a coupling socket and a gyrating nozzle mounted on a connecting portion of the gas-supply tube. When operating the trigger of the grip, compressed air is guided through an air inlet of the grip into the gas-supply tube of the gyrating pattern generator and then forced out of an oblique jet hole of the gyrating nozzle, and at the same time, a centrifugal force is created and force the gyrating nozzle to rotate in an orifice of the attachment tube, and thus, a swirling flow of compressed air is ejected out of the spray gun. Further, the gas-delivery tube can be configured to provide a bottom connection tube for the connection of a water tank, and a water-delivery tube is mounted in the gas-delivery hole of the gas-delivery tube and extended from the bottom connection tube through the gas-supply hole of the gas-supply tube of the gyrating pattern generator into the gas accumulation chamber of the gyrating nozzle and terminating in a water outlet tip that is inserted into a through hole in the gyrating nozzle. Thus, when a swirling flow of compressed air is ejected out of the annular gap in the through hole around the water outlet tip, a flow of fluid is sucked into the bottom connection tube of the gas-delivery tube and the water-delivery tube and ejected out of the water outlet tip of the water-delivery tube, and the fluid being ejected out of the water outlet tip is then turned into a mist, compressed air is simultaneously ejected out of the oblique jet hole, making the mist finer.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A gyrating nozzle spray gun, comprising:
   a grip comprising an air inlet connectable to an external high-pressure air source for the intake of a compressed air, a valve seat, a gas-delivery tube connected to a front side of said valve seat, a trigger operable to open said valve seat for letting said compressed air flow into said gas-delivery tube, said gas-delivery tube comprising a gas-delivery hole in communication with said valve seat and said air inlet and a mating connection portion located at a distal end thereof around one end of said gas-delivery hole; and
   a gyrating pattern generator, said gyrating pattern generator comprising a gas-supply tube connected to said mating connection portion of said gas-delivery tube, said gas-supply tube comprising a connecting portion located at one end thereof remote from said gas-delivery tube and a gas-supply hole axially extending through two opposite ends thereof in communication with said gas-delivery hole, and a coupling socket, a bearing and a gyrating nozzle mounted at said connecting portion of said gas-supply tube, said coupling socket being mounted around said bearing and drivable by said gyrating nozzle to rotate relative to said bearing, said gyrating nozzle being mounted around said coupling socket, said gyrating nozzle comprising a gas accumulation chamber disposed in communication with said gas-supply hole of said gas-supply tube and an oblique jet hole obliquely forwardly extended from said accumulation chamber to the outside of said gyrating nozzle at an eccentric location.

2. The gyrating nozzle spray gun as claimed in claim 1, further comprising an attachment tube connected to said mating connection portion of said gas-delivery tube of said grip, and a gasket ring mounted around said mating connection portion and stopped between said attachment tube and said gas-delivery tube of said grip, wherein said mating connection portion of said gas-delivery tube of said grip comprises a mating connection screw rod extended from an outer end of said valve seat and defining therein a screw hole in communication with said gas-delivery hole; said attachment tube comprises a mating connection end piece located at one end thereof, and a mating connection screw hole defined in said mating connection end piece and threaded onto said mating connection screw rod of said gas-delivery tube of said grip; said gasket ring is mounted around said mating connection screw rod of said mating connection portion and stopped between said gas-delivery tube of said grip and said mating connection end piece of said attachment tube; said gas-supply tube of said gyrating pattern generator comprises a joining end piece located at an opposite end thereof and terminating in a threaded neck that is threaded into said screw hole in said mating connection screw rod of said gas-delivery tube of said grip.

3. The gyrating nozzle spray gun as claimed in claim 1, wherein said attachment tube further comprises an expanded orifice located at an opposite end thereof remote from said mating connection end piece in communication with one end of said accommodation chamber, said attachment tube being selected from the group of horn tubes, straight tubes and polygonal tubes.

4. The gyrating nozzle spray gun as claimed in claim 1, wherein said connecting portion of said gas-supply tube of said gyrating pattern generator comprises a coupling stub tube axially forwardly extended from one end of said gas-supply tube remote from said gas-delivery tube, and a tubular screw rod axially forwardly extended from said coupling stub tube; said bearing comprises an axle hole coupled to said coupling stub tube; said gyrating pattern generator further comprises a locknut threaded onto said tubular screw rod to stop said bearing at said coupling stub tube; said coupling socket comprises a retaining hole fastened to an outer race of said bearing, and an outer thread extending around the periphery thereof; said gyrating nozzle comprises an inner thread threaded onto said outer thread of said coupling socket.

5. The gyrating nozzle spray gun as claimed in claim 4, wherein the outer diameter of said coupling stub tube is smaller than the outer diameter of said gas-supply tube; the outer diameter of said tubular screw rod is smaller than the outer diameter of said coupling stub tube.

6. The gyrating nozzle spray gun as claimed in claim 4, wherein the outer diameter of said locknut is larger than the diameter of said axle hole of said bearing.

7. The gyrating nozzle spray gun as claimed in claim 4, wherein said inner thread of said gyrating nozzle is located in one side of said gyrating nozzle; said gas accumulation chamber of said gyrating nozzle is defined in said gyrating nozzle and inwardly extended from said coupling socket; said oblique jet hole of said gyrating nozzle is obliquely forwardly extended from said accumulation chamber to the outside of said gyrating nozzle at an eccentric location.

8. The gyrating nozzle spray gun as claimed in claim 1, wherein said gyrating nozzle of said gyrating pattern generator further comprises a through hole extended from said gas accumulation chamber to the outside of said gyrating nozzle and disposed at one lateral side relative to said oblique jet hole; said gas-delivery tube is a T-shaped three-way tube, comprising a bottom connection tube located at a bottom side thereof and mounted with a water tank, a dip tube connected to said bottom connection tube and inserted into said water tank for sucking a fluid from said water tank into said bottom connection tube, a water-delivery tube connected to said bottom connection tube in communication with said dip tube and inserted into said gas-delivery hole of said gas-delivery tube and terminating in a water outlet tip, said water outlet tip of said water-delivery tube being inserted into said through hole of said gyrating nozzle.

9. The gyrating nozzle spray gun as claimed in claim 8, wherein the diameter of said through hole is larger than the outer diameter of said water outlet tip of said water-delivery tube so that an annular gap is defined in said through hole around said water outlet tip of said water-delivery tube.

10. The gyrating nozzle spray gun as claimed in claim 1, further comprising an attachment tube connected to said mating connection portion of said gas-delivery tube of said grip, said attachment tube comprising a mating connection end piece located at one end thereof and connected to said mating connection portion, and an accommodation chamber axially extended from said mating connection end piece to an opposite end thereof and accommodating said gas-supply tube of said gyrating pattern generator.

* * * * *